United States Patent [19]
Shen

[11] Patent Number: 5,725,765
[45] Date of Patent: Mar. 10, 1998

[54] TEA MAKER STRUCTURE

[76] Inventor: Shun-Tsung Shen, No. 15, Hsi-An lane, Pu-Li Chen, Nan-Tou Hsien, Taiwan

[21] Appl. No.: 748,538

[22] Filed: Nov. 18, 1996

[51] Int. Cl.[6] .......................... A47J 31/10; A47J 31/06; A47J 31/46

[52] U.S. Cl. .................. 210/238; 210/419; 210/430; 210/474; 210/476; 210/482; 210/497.3; 99/299; 99/305; 99/306; 99/317

[58] Field of Search .............................. 210/238, 419, 210/430, 431, 474, 476, 482, 497.3; 99/299, 317, 306, 300, 304, 305, 295

[56] References Cited

U.S. PATENT DOCUMENTS

| | | |
|---|---|---|
| 111,861 | 2/1871 | Miller . |
| 246,785 | 9/1881 | Kappner . |
| 1,317,717 | 10/1919 | McKinney . |
| 1,665,143 | 4/1928 | McMillan . |
| 1,962,493 | 6/1934 | Ferris . |
| 2,436,784 | 3/1948 | Ballerino . |
| 2,543,528 | 2/1951 | Kaufmann . |
| 4,739,696 | 4/1988 | Shen . |
| 4,785,723 | 11/1988 | Shen . |
| 5,632,193 | 5/1997 | Shen . |
| 5,632,194 | 5/1997 | Lin . |

*Primary Examiner*—Thomas M. Lithgow
*Attorney, Agent, or Firm*—Morton J. Rosenberg; David I. Klein; Jun Y. Lee

[57] ABSTRACT

A tea maker structure is disclosed. It includes a percolator cup as an upper layer of the tea maker and a tea cup as a lower layer of the tea maker. A bottom of the percolator cup is formed with a water outlet communicating with the tea cup. A filter mesh is disposed above the water outlet to prevent tea grounds from blocking the water outlet. The opening/closing of the water outlet is controlled by a controlling mechanism coaxially disposed in the percolator cup, whereby the tea can flow into the tea cup with the tea grounds remaining in the percolator cup. Also, this tea maker is prevented from falling down due to improper application.

5 Claims, 6 Drawing Sheets

TEA MAKER STRUCTURE

BACKGROUND OF THE INVENTION

The present invention relates to a tea maker structure including a percolator cup as an upper layer of the tea maker and a tea cup as a lower layer of the tea maker. The opening/closing of a water outlet of the percolator cup is controlled by a controlling mechanism coaxially disposed in the percolator cup, whereby the tea can flow into the tea cup with the tea grounds remaining in the percolator cup.

FIGS. 1 to 3 show a conventional tea maker including a percolator cup 11 coaxially fitted in an upper opening of a tea cup 12. The percolator cup 11 is disposed with a cup cap 13 and formed with a water outlet 14 on the bottom for communicating with the tea cup 12. A filter mesh 15 is disposed above the water outlet 14. A depression rod 16 is disposed on an inner edge of the percolator cup 11 and longitudinally movably passed through a locating section 17. The top end 161 of the depression rod 16 extends out of a through hole 131 of the cup cap 13, while a bottom end 162 thereof contacts with one end of a driving lever 18. The other end of the driving lever 18 is connected with a top end of a steel ball 19. Accordingly, by means of depressing the depression rod 16, the bottom end 162 thereof will press down the driving lever 18, making the steel ball 19 pivoted upward from the water outlet 14 so as to communicate the percolator cup 11 with the tea cup 12. After released, the steel ball 19 drops down to make driving lever 18 lift the depression rod 16 with its top end 161 protruding beyond the through hole 131 of the cup cap 13.

The above tea maker serves to make a great amount of tea. However, several shortcomings still exist in actual operation of such tea maker as follows:

The entire tea maker including the tea leaves and tea will have a considerably heavy weight. Moreover, the depression rod 16 is disposed on the edge of the percolator cup 11 as an upper layer of the tea maker so that the point of application force is too far away from the axis. Also, the gravity center of the percolator cup 11 is too high. Therefore, to a user not so familiar with this operation, the depression rod 16 may be depressed by an excessively great force to make the tea maker fall down. As a result; the hot tea may pour out to cause danger or get hurt.

SUMMARY OF THE INVENTION

To obviate the above problems, it is a primary object of the present invention to provide an improved tea maker in which a controlling mechanism is coaxially disposed in the percolator cup, whereby the depression force is applied to the center of the percolator cup without deflection so that the tea maker is prevented from falling down due to improper application force and the safety is ensured.

According to the above object, the tea maker of the present invention includes a percolator cup as an upper layer of the tea maker and a tea cup as a lower layer of the tea maker.

The percolator cup is fitted in an opening of top end of the tea cup. A cup cap is disposed on an upper opening of the percolator cup. A bottom of the percolator cup is formed with a water outlet communicating with the tea cup. A filter mesh is disposed above the water outlet. The opening/closing of the water outlet is controlled a controlling mechanism coaxially disposed in the percolator cup.

The controlling mechanism includes a hollow casing connected with the filter mesh and upward extending from a center thereof. The casing is communicated with the water outlet. A driving member and a driven member are disposed in the casing. A top end of the driving member protrudes beyond a central through hole of the cup cap. A bottom end of the driven member is connected with a water sealing member for blocking the water outlet. A linking member is disposed between the driving member and driven member and pivotally disposed on a shaft radially passed through the casing, whereby the driving member and the driven member are longitudinally movable relative to each other.

The present invention can be best understood through the following description and accompanying drawing, wherein:

DETAILED DESCRIPTION OF THE PREFERRED EMBODIMENTS

Figure 1:
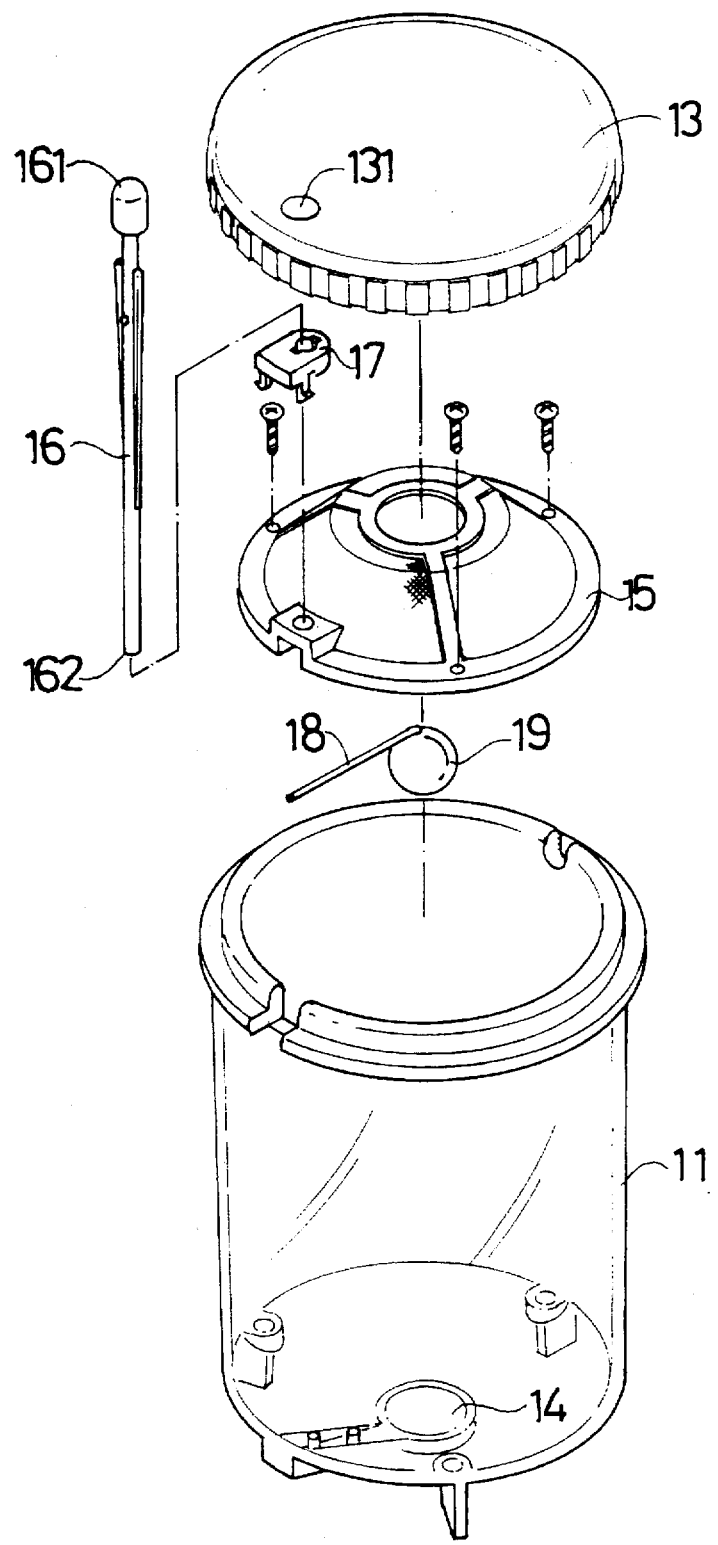
FIG. 1 is a perspective exploded view of a conventional tea maker.
Figure 2:
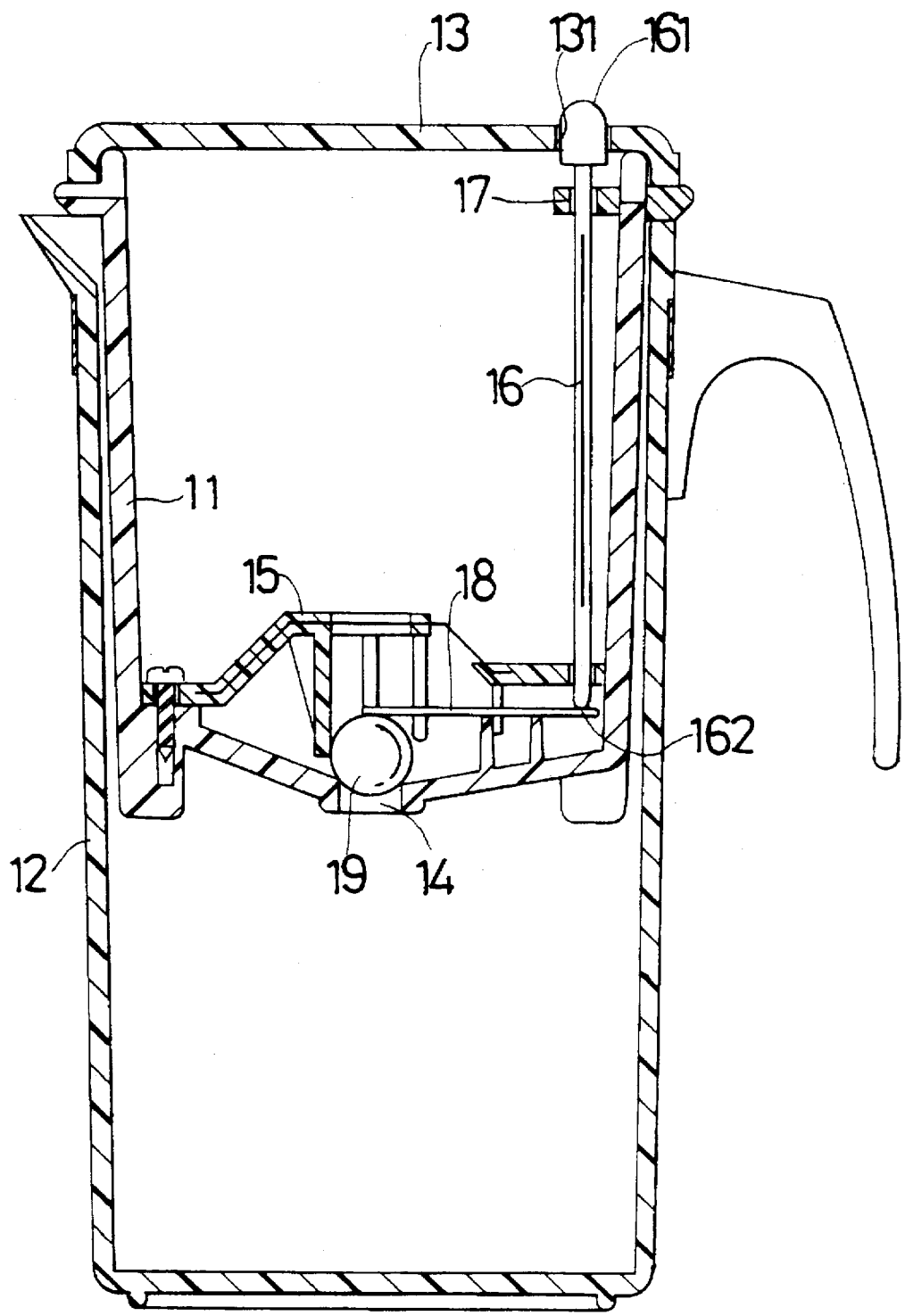
FIG. 2 is a sectional assembled view of the conventional tea maker.
Figure 3:
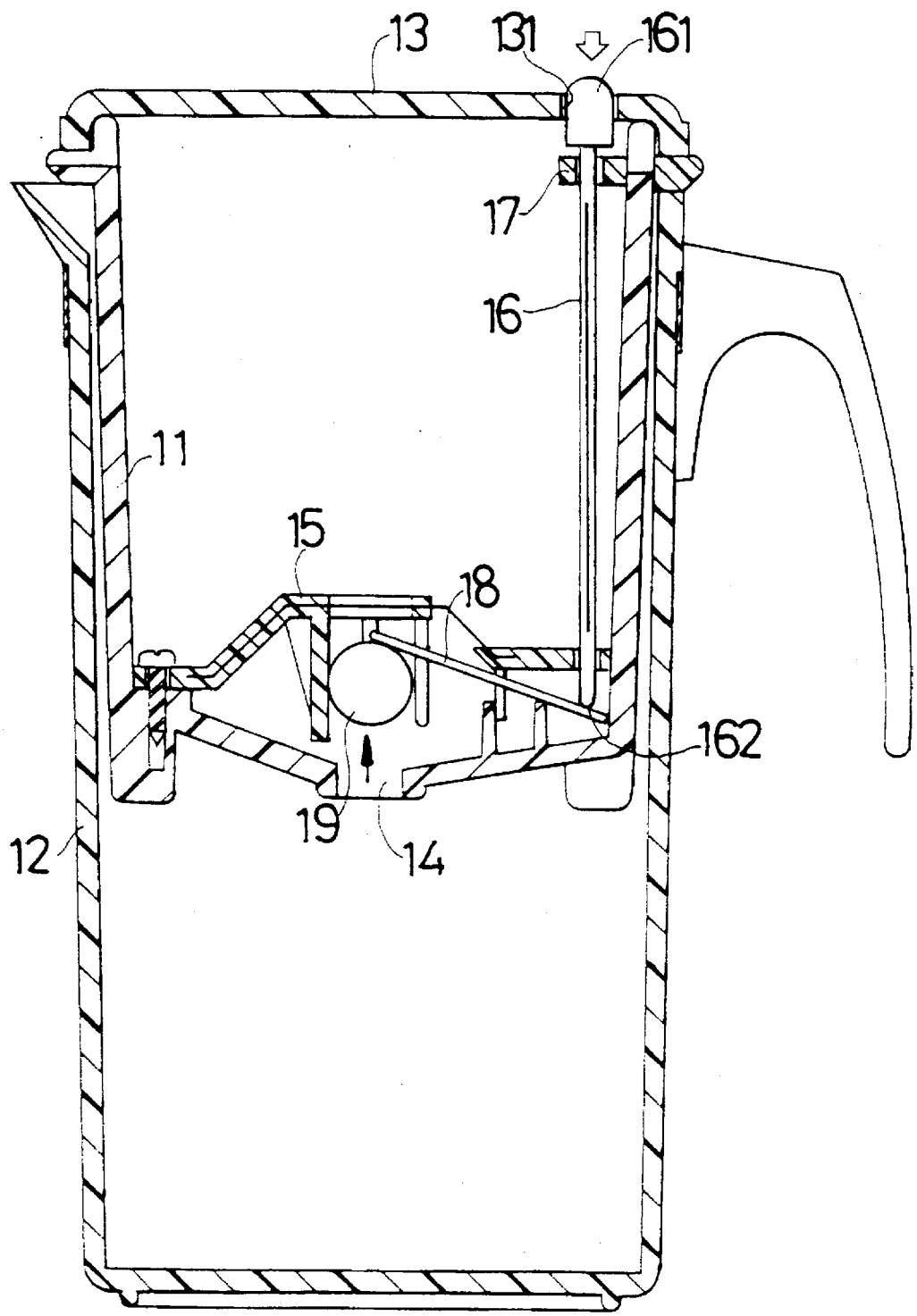
FIG. 3 is a view according to FIG. 2, showing the operation of the conventional tea maker.
Figure 4:
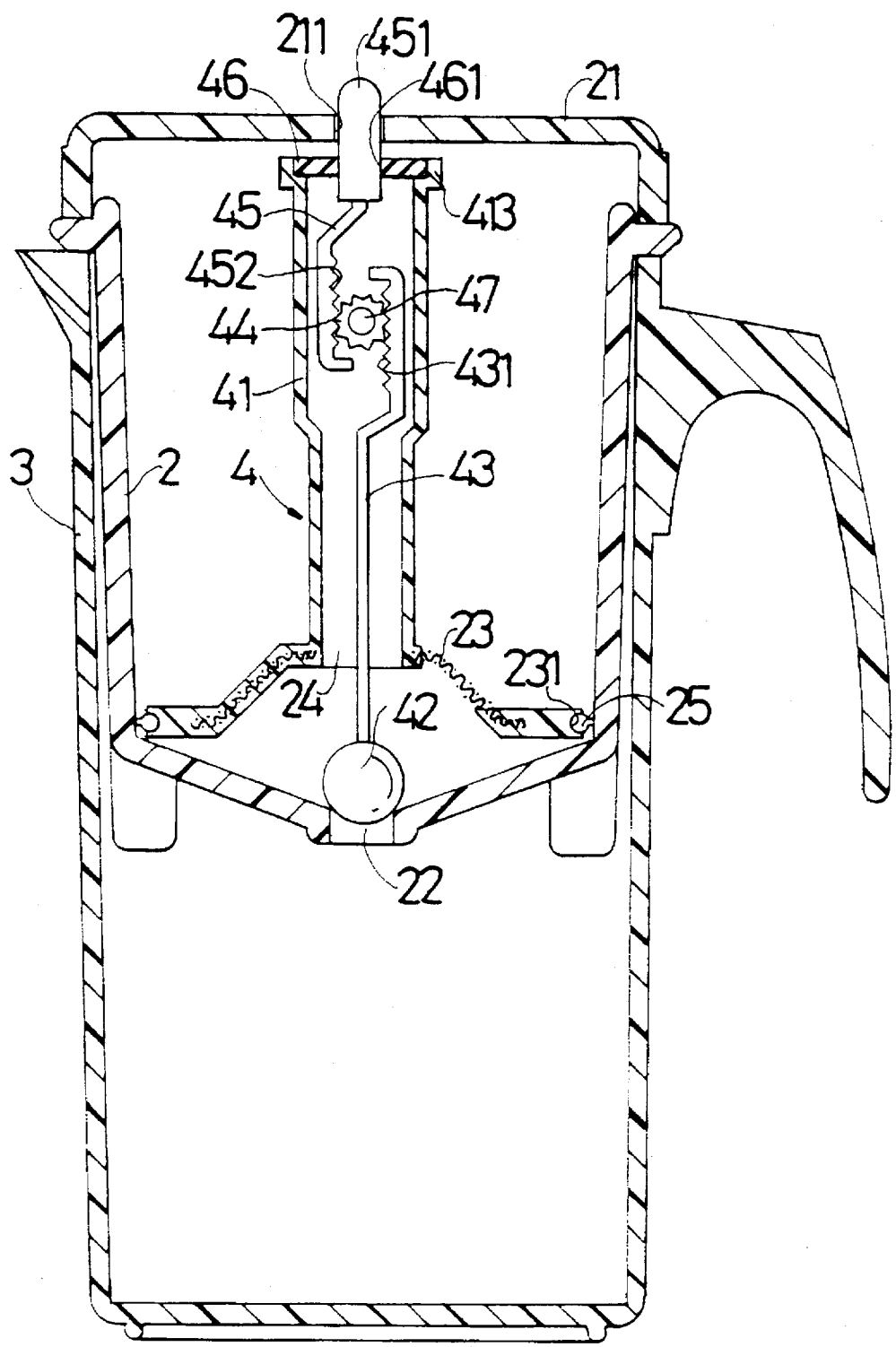
FIG. 4 is a sectional assembled view of a first embodiment of the present invention.

Please refer to FIG. 4. The tea maker of a first embodiment of the present invention includes a percolator cup 2 and a tea cup 3 both of which have openings on top faces. The opening of the percolator cup 2 is covered by a cup cap 21. The bottom of the percolator cup 2 is disposed with a water outlet 22 and a filter mesh 23 located above the water outlet 22. The filter mesh 23 is formed with a central through hole 24 communicated with the water outlet 22. The outer periphery of the filter mesh 23 is disposed with dented section 231 for an annular resilient ring 25 to fit therein. The resilient ring 25 contacts with the inner wall of the percolator cup 2, serving as a stopper body to prevent the tea grounds from dropping into the tea cup 3. The percolator cup 2 is fitted into the opening of the tea cup 3, whereby the percolator cup 2 forms an upper layer of the tea maker, while the tea cup 3 forms a lower layer thereof. The opening/closing of the water outlet 22 is controlled by a controlling mechanism 4.

In this embodiment, the controlling mechanism 4 is coaxially disposed in the percolator cup 2, including a casing 41, a water sealing member 42, a driven member 43, a linking member 44 and a driving member 45.

The casing 41 is integrally connected with the center of the filter mesh 23 and upward extends therefrom. The casing 41 has a hollow interior extending from top end to bottom end. The top end of the casing 41 is formed with an enlarged section 413 for easy taking. The casing is located between the cup cap 21 and the filter mesh 23, whereby the interior of the casing 41 through the through hole 24 of the filter mesh 23 communicates with the water outlet 22. The top end of the casing 41 protrudes beyond the opening of the percolator cup 2. A cover body 46 is inserted in the enlarged section 413 and formed with a hole 461 for a top end 451 of the driving member 45 to protrude therethrough.

The driven member 43 is axially movably disposed in the casing 41, abutting against a lateral wall of the casing 41. The driven member 43 is disposed with a longitudinal rack 431. The bottom end of the driven member downward extends into the filter mesh to connect with the water sealing member 42. In this embodiment, the water sealing member 42 is a steel ball positioned above the water outlet 22 and having a diameter larger than that of the water outlet 22 for blocking the same.

The driving member 45 is axially movably disposed in the casing 41, abutting against the other lateral wall of the casing 41. The top end 451 of the driving member 45 extends out of the cover body 46 of the casing 41 and protrudes beyond the through hole 211 of the cup cap 21. The bottom end of the driving member 45 is disposed with a longitudinal rack 452.

Figure 6:
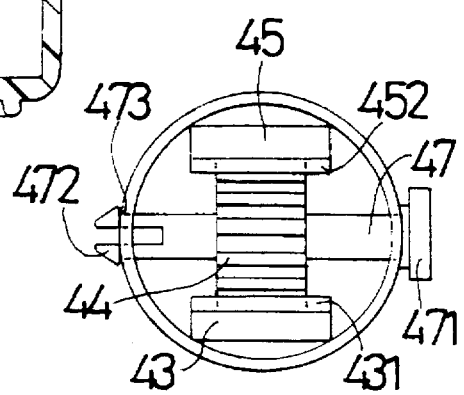
FIG. 6 is a sectional view taken along line VI—VI of FIG. 5.

Please refer to FIG. 6. The linking member 44 is rotatably disposed on a shaft 47. In this embodiment, the linking member 44 is a gear. The shaft 47 is radially passed through the casing 41. One end of the shaft 47 is disposed with a large diameter section 471 stopped by the peripheral wall of a through hole 411 formed on one side of the casing 41. The other end of the shaft is disposed with a conic latch head 472 having bulge section 473 and divided into two halves by a fissure as shown in FIG. 6, whereby the latch head 472 is passed through a through hole 412 formed on the other side of the casing 41 with the bulge section 473 abutting against the peripheral wall of the through hole 412 to locate the shaft 47. The shaft is disposed between the top end of the driven member 43 and the bottom end of the driving member 45 and engaged with both the rack 431 of the driven member 43 and the rack 452 of the driving member 45. When the weight of the water sealing member 42 pulls the driven member 43 downward, by means of rotation of the gear 44, the driving member 45 upward extends out of the cup cap 21 for a user to depress.

Figure 5:
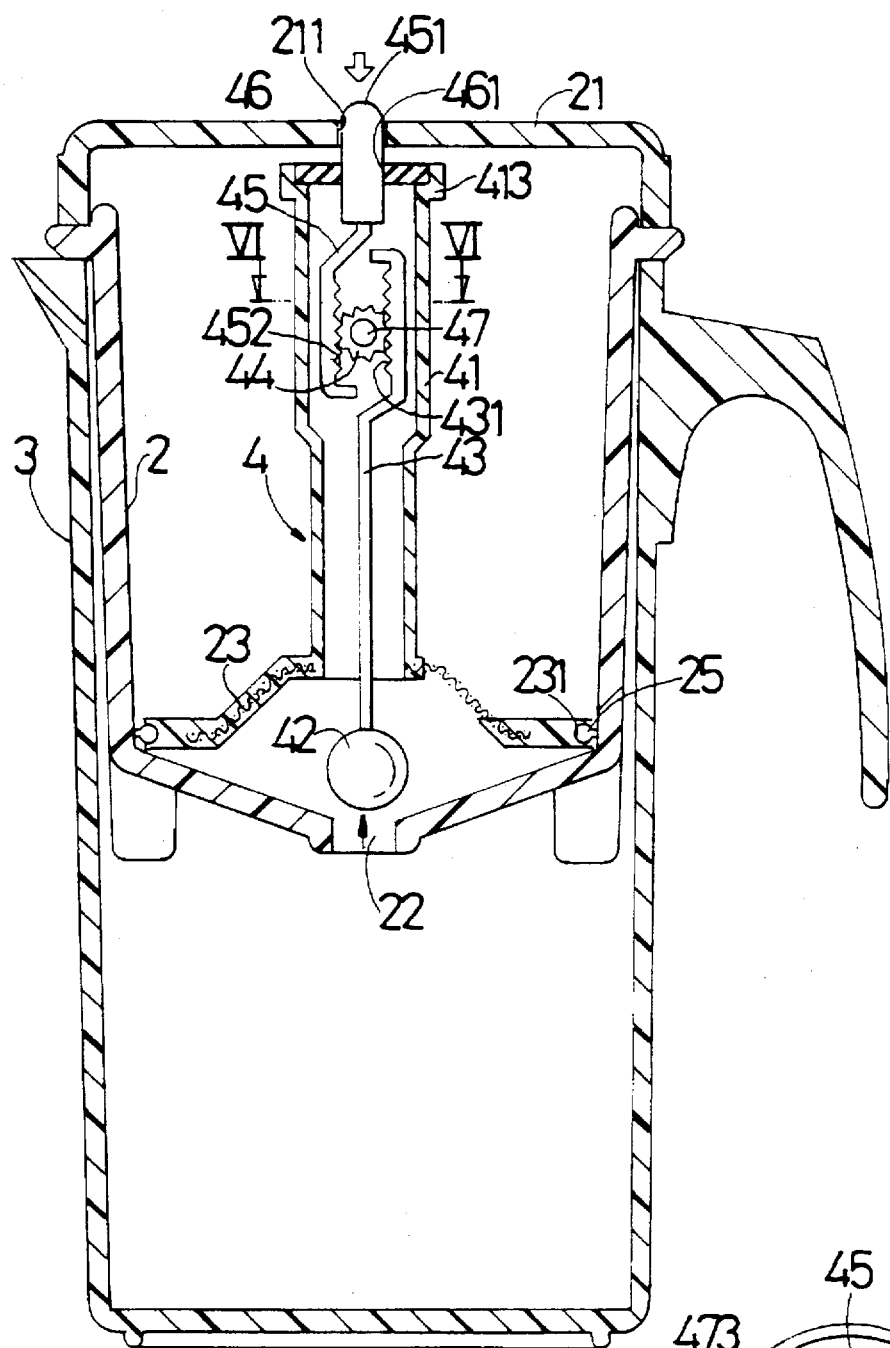
FIG. 5 is a view according to FIG. 4, showing the operation of the present invention.

Referring to FIG. 5, by means of the controlling mechanism, the tea in the upper layer of percolator cup can flow into the lower layer of tea cup. When the top end 451 of the driving member 45 protruding beyond the cup cap 21 is depressed and moved downward, the rack 452 drives the linking member 44 to counterclockwise rotate, whereby the driven member 43 is driven by the linking member 44 to move upward and pull the water sealing member 42 upward from the water outlet 22, permitting the tea to flow into the tea cup 3. When the driving member 45 is released, the driven member 43 is pulled and moved downward by the weight of the water sealing member 42, whereby the linking member 44 is rotated, making the driving member 45 move upward with its top end 451 protruding beyond the cup cap 21.

Figure 7:
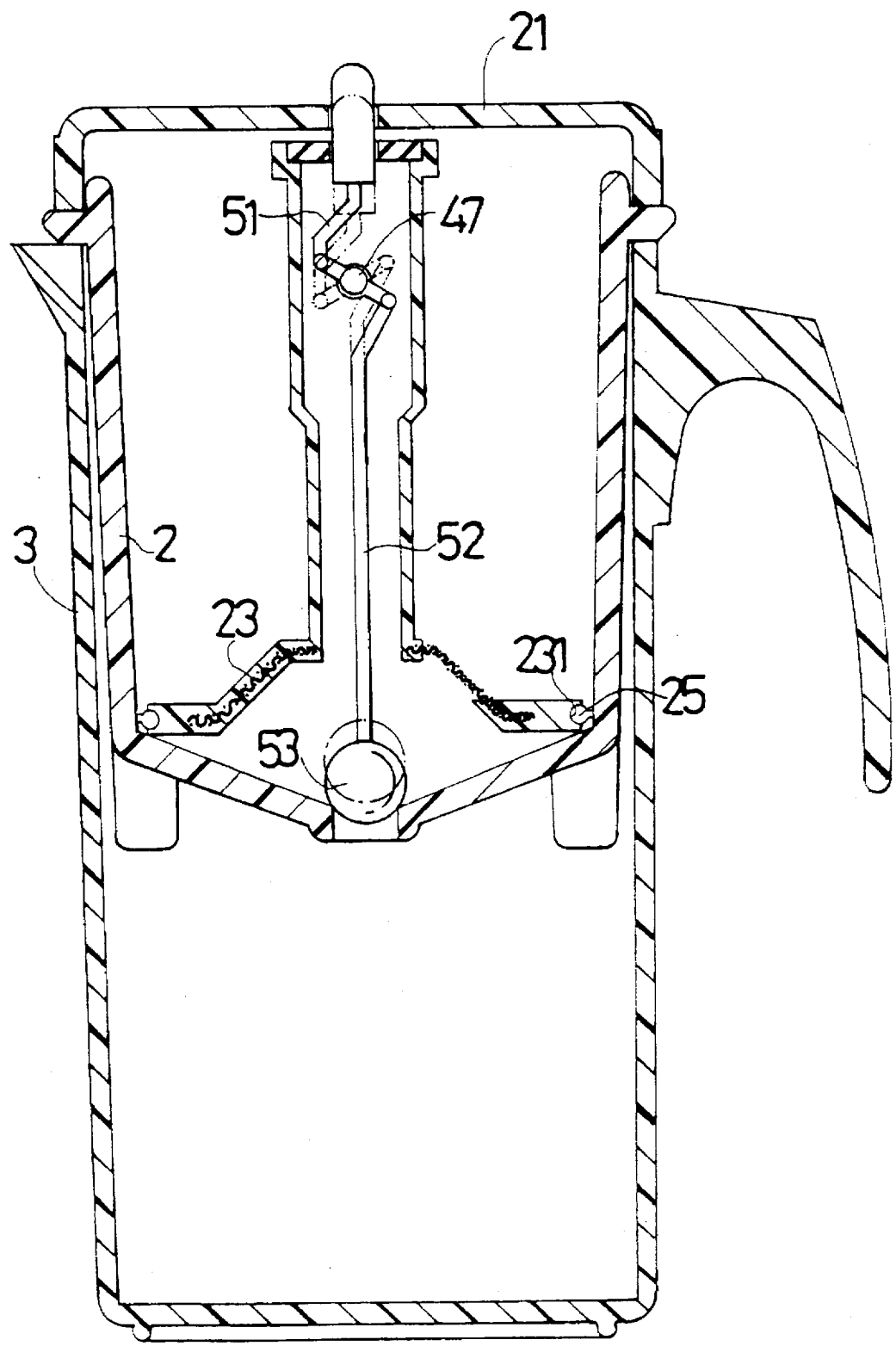
FIG. 7 is a sectional assembled view of a second embodiment of the present invention, showing the operation thereof.

Referring to FIGS. 6 and 7, according to a second embodiment of the present invention, the linking member 5 is a lever pivotally disposed on the shaft 47 of the casing 41. One end of the lever is pivotally connected with the bottom end of the driving member 51, while the other end of the lever is pivotally connected with the top end of the driven member 52 to create a leverage effect. When the driving member 51 is depressed, the lever 5 is swung to drive the driven member 52 to move upward, making the water sealing member 53 separate from the water outlet 22.

It is to be understood that the above description and drawings are only used for illustrating some embodiments of the present invention, not intended to limit the scope thereof. Any variation and derivation from the above description and drawings should be included in the scope of the present invention.

What is claimed is:

1. A tea maker structure comprising a percolator cup and a tea cup, the percolator cup being fitted in an opening of top end of the tea cup, a cup cap being disposed on an opening formed on top end of the percolator cup, a bottom of the percolator cup being formed with a water outlet, a filter mesh being disposed above the water outlet, the water outlet being communicated with the tea cup, the opening/closing of the water outlet being controlled by a controlling mechanism, wherein:

the controlling mechanism includes a hollow casing connected with the filter mesh and upward extending from a center thereof, the casing being communicated with the water outlet, a driving member and a driven member being disposed in the casing, a top end of the driving member protruding beyond a central through hole of the cup cap, a bottom end of the driven member being connected with a water sealing member for blocking the water outlet, a linking member being disposed between the driving member and driven member and pivotally disposed on a shaft radially passed through the casing, whereby the driving member and the driven member are longitudinally movable relative to each other.

2. A tea maker structure as claimed in claim 1, wherein the linking member is a gear engaged with a longitudinal rack of the driving member on one side and engaged with a longitudinal rack of the driven member on the other side, whereby when the driving member is moved downward, the gear is rotated to drive the driven member to move upward, making the water sealing member at the bottom end of the driven member separate from the water outlet.

3. A tea maker structure as claimed in claim 1, wherein one end of the shaft is disposed with a large diameter section stopped by a peripheral wall of a through hole formed on one side of the casing, while the other end of the shaft is disposed with a conic latch head having a bulge section and divided into two halves by a fissure, whereby the latch head is passed through a through hole formed on the other side of the casing with the bulge section abutting against a peripheral wall of the through hole to locate the shaft.

4. A tea maker structure as claimed in claim 1, wherein an outer periphery of the filter mesh is disposed with dented section for an annular resilient ring to fit therein, the resilient ring contacting with an inner wall of the percolator cup to prevent tea grounds from dropping into the tea cup.

5. A tea maker structure as claimed in claim 1, wherein the linking member is a lever pivotally disposed on the shaft at its center, one end of the lever being pivotally connected with the bottom end of the driving member, while the other end of the lever being connected with the top end of the driven member.

* * * * *